US008422362B2

(12) United States Patent
Wang et al.

(10) Patent No.: US 8,422,362 B2
(45) Date of Patent: Apr. 16, 2013

(54) RELIABILITY AS AN INTERDOMAIN SERVICE

(75) Inventors: Jia Wang, Randolph, NJ (US);
Alexandre Gerber, Madison, NJ (US);
Albert Greenberg, Seattle, WA (US);
Hai Paul Liu, New Haven, CT (US);
Hao Wang, New Haven, CT (US); Y. Richard Yang, New Haven, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/186,054

(22) Filed: Aug. 5, 2008

(65) Prior Publication Data

US 2010/0034084 A1    Feb. 11, 2010

(51) Int. Cl.
*G01R 31/08*    (2006.01)

(52) U.S. Cl.
USPC ............ 370/225; 370/244; 370/245; 370/401

(58) Field of Classification Search .......... 370/216–238, 370/242–245, 400, 401, 408–411
See application file for complete search history.

(56) References Cited

U.S. PATENT DOCUMENTS

| 5,931,900 | A | 8/1999 | Notani et al. |
| 5,995,945 | A | 11/1999 | Notani et al. |
| 6,332,130 | B1 | 12/2001 | Notani et al. |
| 6,665,273 | B1 | 12/2003 | Goguen et al. |
| 6,795,902 | B2 | 9/2004 | Frick |
| 6,993,593 | B2 * | 1/2006 | Iwata ............................. 709/238 |
| 7,020,753 | B2 | 3/2006 | Shanahan et al. |
| 7,581,022 | B1 * | 8/2009 | Griffin et al. ................. 709/238 |
| 7,583,602 | B2 * | 9/2009 | Bejerano et al. ............. 370/238 |
| 7,664,044 | B2 * | 2/2010 | Zhai ............................. 370/242 |
| 7,693,047 | B2 * | 4/2010 | Guichard et al. ............. 370/217 |
| 7,697,416 | B2 * | 4/2010 | Shand et al. .................. 370/216 |
| 7,710,872 | B2 * | 5/2010 | Vasseur ....................... 370/230 |
| 7,814,227 | B2 * | 10/2010 | Vasseur et al. ................ 709/241 |
| 7,904,586 | B1 * | 3/2011 | Griffin et al. ................. 709/238 |
| 8,018,952 | B1 * | 9/2011 | Ayyangar ..................... 370/396 |
| 2006/0126496 | A1 * | 6/2006 | Filsfils et al. ................. 370/216 |
| 2007/0101018 | A1 | 5/2007 | Shirazipour et al. |
| 2007/0171893 | A1 | 7/2007 | Xu et al. |
| 2007/0186273 | A1 | 8/2007 | Carpy et al. |
| 2007/0214284 | A1 | 9/2007 | King et al. |
| 2008/0056142 | A1 * | 3/2008 | Arnold et al. ................ 370/248 |
| 2008/0137649 | A1 * | 6/2008 | Li et al. ........................ 370/356 |

OTHER PUBLICATIONS

R. Hartani, "Flow-Based Routing Boosts MPLS Service", EETimes.com, pp. 1-2 (2003).

* cited by examiner

*Primary Examiner* — Christopher Grey
(74) *Attorney, Agent, or Firm* — Hoffman & Baron, LLP

(57) ABSTRACT

A system and techniques to increase the redundancy (i.e., physical diversity and bandwidth) available to an IP network, thereby increasing the failure processing capability of IP networks. The techniques include pooling the resources of multiple networks together for mutual backup purposes to improve network reliability and employing methods to efficiently utilize both the intradomain and the interdomain redundancies provided by networks at low cost.

20 Claims, 6 Drawing Sheets

FIG. 3

| | |
|---|---|
| Destination: | $a1$ |
| AS path: | the AS path traversed by this bypass path. It will be $AB$. |
| Bypass path: | $a2, b2$, opaque ID identifying the internal path Inside $B$ from $b_2$ to $b_1$, to $b1$, $a1$ |
| Path metrics: | these include aggregated delay from $b2$ to $b1$, best-effort bandwidth $b2$ can provide to $b1$, and guaranteed bandwidth $b2$ can provide to $b1$, etc. |
| Shared risk link groups: | the IDs of the shared risk link groups involved in the path from $b2$ to $b1$ |

FIG. 4

1. construct a DAG from flow-based routing $f_{ab}$
2. $i \leftarrow 1, P_{ab} \leftarrow \emptyset$
3. while (termination condition not met)
4.     compute max unsplittable flow $P_{ab}^i$ satisfying SLA
6.     add flow path $P_{ab}^i$ to path set $P_{ab}$
7.     deduct flow rate $P_{ab}^i$ from link capacities along $P_{ab}^i$
8.     remove links with capacity 0 from DAG
9.     $i \leftarrow i+1$

FIG. 5

We first compute a base routing with hose-model VPN bandwidth provisioning using (8);

$$\min_f o(f;D) \tag{8}$$

s.t. $f$ is a routing;

$\forall d \in X : c(f,d) \leq \bar{r}$; (penalty envelope)

$\forall$ link $l \in E$ and VPN traffic demand matrix $d^w$ such that $$\forall a \in V, \sum_{b \in V} d^w_{ab} \leq ECR(a), \sum_{b \in V} d^w_{ba} \leq ICR(a);$$

$$\sum_{a,b \in V} d^w_{ab} f_{ab}(l) \leq cap(l). \quad \text{(VPN provisioning)}$$

Let $f^*$ be a solution to (8). For each high-priority failure scenario $h \subseteq E$, our algorithm first tries to solve (9):

$$\min_{f^{hB}, f^{hV}} r \tag{9}$$

s.t. $f^{h,B}$ is a fast rerouting in $E \cup E'$
bypassing links $e \in h$ for best-effort traffic;

$f^{h,V}$ is a fast rerouting in $E$
bypassing links $e \in h$ for VPN traffic;

$\forall$ link $l \in E \cup E'$, $l \notin h$ and $d$ such that $OU_{G/h}(d) = 1$:

$$\sum_{a,b \in V} d_{ab} (f^*_{ab}(l) + \sum_{e \in k} (f^*_{ab}(e) f^{h,B}_e(l)) \leq r \cdot cap(l), \text{ and}$$

$$\sum_{a,b \in V} d_{ab} (f^*_{ab}(l) + \sum_{e \in h} (f^*_{ab}(e) f^{h,V}_e(l)) \leq r \cdot cap(l);$$

$\forall$ link $l \in E$, $l \in h$ and $d^w$ such that $$\forall a \in V, \sum_{b \in V} d^w_{ab} \leq ECR(a), \sum_{b \in V} d^w_{ba} \leq ICR(a);$$

$$\sum_{a,b \in V} d^w_{ab} (f^*_{ab}(l) + \sum_{e \in h} f^*_{ab}(e) f^{h,V}_e(l) \leq cap(l); \tag{10}$$

FIG. 5(Continued)

CONTINUED FROM FIG.5

In (9), constraint (10) requires that all VPN traffic be completely rerouted using intradomain links only.

If (9) has no feasible solution (i.e., it cannot reroute VPN traffic using intradomain links only), we solve (11):

$$\min_{f^h} \quad r \quad (11)$$

s.t. $f^h$ is a fast rerouting in $E \cup E'$ bypassing all links in $h$:

$\forall \text{link } l \in E \cup E', l \notin h$ and $d$ such that $OU_{G/h}(d) = 1$:

$$\sum_{a,b \in V} d_{ab} (f^*_{ab}(l) + \sum_{e \in h} (f^*_{ab}(e) f^h_e(l))) \leq r \cdot cap(l).$$

In (11), there is no distribution between best-effort and VPN traffic.

The VPN bandwidth provisioning constraint in (8) involves exponential number of constraints by applying linear programming duality;

$$\forall a \in V : \mu(a) \geq 0, v_l(a) \geq 0;$$
$$\forall a,b \in V : f_{ab}(l) \leq \mu(a) + v_l(b);$$
$$\sum_{a \in V} (\mu(a) ECR(a) + v_l(a) lCR(a)) \leq cap(l).$$

The constraint (10) can be handled in a similar way.

FIG. 6

PROOF. First consider an OD pair $a \to b$ and the corresponding path set $P_{ab} = \{p_{ab}^l, ..., r_{ab}^{pk}\}$. By definition of a $Q$-percentage coverage path set, there exists a path-based routing $\tilde{P}_{ab}$ with value $[\tilde{P}_{ab}] = Q$. Let $\mathcal{P}_{ab}$ be another path based routing over $P_{ab}$ such that $p_{ab}^k = \frac{1}{Q} \bar{p}_{ab}^k$, for all $k = 1,...,K$. We have $$|\mathcal{P}_{ab}| = \sum_{k=1}^{K} p_{ab}^k = \sum_{k=1}^{K} \frac{1}{Q} \bar{p}_{ab}^{-k} = \frac{1}{Q} |\tilde{P}_{ab}| = \frac{1}{Q} \cdot Q = 1.$$

Thus, $\mathcal{P}_{ab}$ is a valid path based routing from $a$ to $b$ over the path set $P_{ab}$. Applying the same scaling for all OD pairs, we obtain a valid path-based routing $p$ for the network over the $Q$-percentage coverage path set $P$.

Now for any demand $d$ and any link $l \in E$, we have $$\sum_{a,b \in V} \sum_{k:l \in P_{ab}^k} d_{ab} p_{ab}^k = \sum_{a,b \in V} \sum_{k:l \in P_{ab}^k} \frac{1}{Q} d_{ab} \bar{p}_{ab}^k \leq \frac{1}{Q} \sum_{a,b \in V} d_{ab} f_{ab}^{(i,j)},$$

where the last inequality holds due to inequality (3). This completes the proof. □

RELIABILITY AS AN INTERDOMAIN SERVICE

BACKGROUND OF THE INVENTION

1. Field of the Invention

The present invention generally relates to network services, and more particularly to providing interdomain services for network reliability.

2. Brief Description of the Related Art

Reliability is a major concern in Internet Protocol (IP) networks. As the Internet becomes a critical infrastructural component of the global information-based society, the availability and resilience of the Internet under failures can have significant global and social effects.

Various techniques have been developed to improve communication network reliability. For example, in the past, networks have relied on link layer techniques, such as SONET rings, to protect networks against failures. More recently, due to the relatively high cost of SONET protection and the lower cost and improved flexibility of IP, networks now utilize the IP layer to handle failures.

In some implementations, restoration techniques have been used in the IP layer for rerouting data under potential failures. A potential drawback of these restoration techniques is their relatively slow response time, which may not be able to meet the requirements of some mission-critical applications (e.g., VPN networks carrying VoIP traffic). The restoration techniques also can include MPLS-based protection techniques that pre-compute rerouting paths and quickly reroute traffic upon failure detection. The two basic protection mechanisms are link protection (i.e., fast rerouting (FRR)), and path protection. In FRR, a detour around a failed link is created. In path protection, the sources of flows using a failed link are identified and rerouted to avoid the failed link. An advantage of path protection is that, since alternate paths are computed for each source, it can avoid potential bottlenecks around the head end of a failed link, and thus achieve better rerouting performance.

Although these techniques have enhanced IP network reliability, they generally require significant investments. Accordingly, a major challenge remains in obtaining redundancy in IP networks at a reasonable cost. As used herein, the term redundancy refers to both the diversity of physical connectivity and the over-provisioning of bandwidth to carry traffic originally passing through any failed equipment. In addition, with the cost of over-provisioning and, in particular, the expenses to obtain rights-of-way to install alternative paths (e.g., along natural gas pipelines, highways or railways), many IP networks, in particular Internet Service Provider (ISP) networks, face the challenge of adding redundancy in a cost-effective way to stay competitive in the highly competitive ISP market.

SUMMARY OF THE INVENTION

A system and techniques are disclosed that increase the redundancy (i.e., physical diversity and bandwidth) available to an IP network, thereby increasing the failure processing capability of IP networks. The techniques include pooling the resources of multiple networks together for mutual backup purposes to improve network reliability and employing methods to efficiently utilize both the intradomain and the interdomain redundancies provided by networks at low cost.

For example, large IP networks that cover the same geographic regions and install their routers at similar sites (e.g., major cities) can be overlayed, such that for two sites in both networks, when one network does not have direct links between these two sites, the other network may have. Preferably, even when both networks have direct links between these two sites, the links can be placed at different locations (e.g., one along highway and the other along railway). Thus, when there is a failure inside one network, the other network can provide redundancy. By providing a system that allows neighboring networks to use the resources of each other as backup, the present invention provides improved network reliability at low social and network cost.

Various aspects of the system relate to generating paths based on flow-based routing representations. For example, according to one aspect, a system for providing network reliability includes a first network, a second network operatively coupled to the first network, and a control module operatively coupled to the first and second networks. The control module is adapted to provide a bypass path linking first and second portions of the first network in response to a connectivity failure in said first network.

Preferably, the control module routes data packets between said first and said second portions of said first network using said bypass path. In one preferred embodiment, the bypass path is a data path between the first and second networks. Preferably, the control module signals the availability of the data path using a Border Gateway Protocol message.

In one embodiment, the controller extracts a plurality of data paths from at least one of the first and second networks and computes a selected path to route said plurality of data packets using traffic engineering. The controller also can compute fast rerouting upon a network failure in the first or second network and selects the selected path based on the computation.

In one preferred embodiment, the controller distinguishes voice and virtual private network (VPN) data packets from the data packets and routes the voice and VPN data packets over the selected path. The controller can also calculate the selected path by converting a flow representation of the data packets transmitted between an origin and destination router to a path-based routing representation.

In one preferred embodiment, the controller calculates the selected path by determining a maximum unsplittable flow between the origin and destination routers that satisfies a service level delay constraint. The controller can also select the selected path using a mixed integer program (MIP).

In another aspect, a method for providing network reliability includes coupling operatively a first network to a second network, and providing a control module operatively coupled to the first and second networks. The control module providing a bypass path linking first and second portion of said first network in response to a failure in said first network.

In one preferred embodiment, the method includes routing data packets between the first and second portions of the first network using the bypass path. Preferably, the bypass path is a data path between the first and second networks. The method also can include signaling the availability of the data path using a Border Gateway Protocol message.

In another preferred embodiment, the method includes extracting a plurality of data paths from at least one of the first and second networks, and computing a selected path to route the data packets using traffic engineering. The method also can include calculating fast rerouting upon a network failure in the first or second network and selecting the selected path based on the computation.

The method can also include distinguishing voice and virtual private network (VPN) data packets from the data packets, and routing the voice and VPN data packets over the selected path.

In one embodiment, the method includes calculating the selected path by converting a flow representation of the data packets transmitted between an origin and destination router to a path-based routing representation. The method can also include calculating the selected path by determining a maximum unsplittable flow between the origin and destination routers that satisfies a service level delay constraint. In one embodiment, the method also includes selecting the selected path using a mixed integer program (MIP).

In some embodiments, one or more of the following advantages may be present. The system can improve the effectiveness of both restoration and protection implementations by utilizing them over an augmented intradomain topology with virtual links that correspond to additional interdomain bypass paths. The added virtual links can increase the redundancy available to these techniques, and therefore can improve algorithmic performance.

A system, as well as articles that include a machine-readable medium storing machine-readable instructions for implementing the various techniques, are disclosed.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 3 is an example REIN-PATH-AVAILABLE message.

FIG. 4 is a flow chart for generating paths based on flow-based routing.

FIG. 5 is detailed formulation and method for implementing Robust Fast Rerouting according to the present invention.

FIG. 6 illustrates construction of a path-based routing.

Like reference symbols in the various drawings indicate like elements.

DETAILED DESCRIPTION OF THE EMBODIMENTS

The present invention protects an IP network against failures from both inside and outside the network by protecting intradomain links and directly connected interdomain (peering) links. An example of the type of events the present invention can address is shown in connection with FIG. 1.

Figure 1:
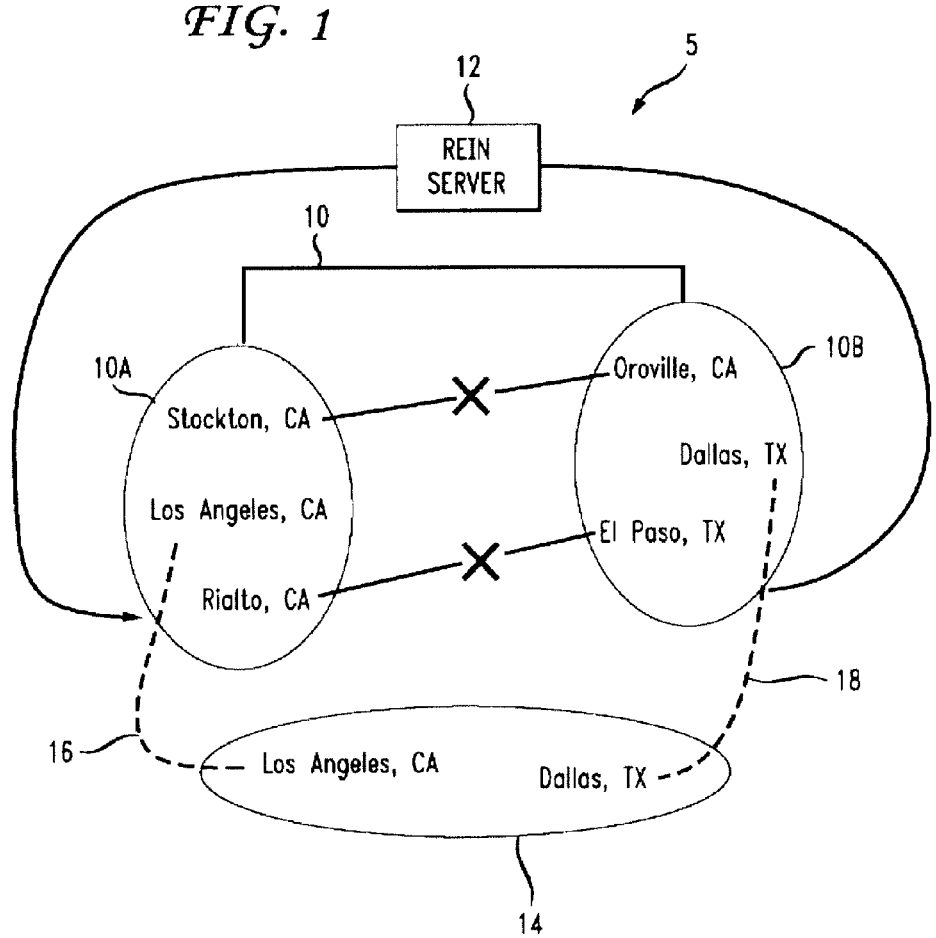
FIG. 1 is a block diagram illustrating use of interdomain bypass for a partitioned network backbone.

FIG. 1 illustrates a system 5 that includes a major backbone network 10 partitioned into two disconnected components 10A, 10B by two fiber cuts. A result of such partition can lead to the disconnection of long-distance service for millions of customers, network partitions for corporations that rely on the carrier to link office networks, and substantially decreased throughput of transcontinental Internet traffic routed over the backbone.

As shown in FIG. 1, in one preferred embodiment, the system 5 includes a server 12 that provides reliability services, hereinafter referred to as a REIN server, and that can route traffic between disconnected components through a neighboring IP network 14. As used herein, the term interdomain bypass paths refers to such routes through neighboring IP networks. As shown in FIG. 1, both of the two disconnected components 10A, 10B of the network 10 have peers connected to a neighboring network. For example, FIG. 1 shows one peering 16 between the backbone 10 and the neighboring network at Los Angeles, and another peering 18 of the two networks at Dallas. Accordingly, using the present invention, the backbone network 10 can use the neighboring network 14 as a backup and thus greatly reduce the impact of the partitioning.

The REIN server 12 can be useful when an JP network is not partitioned, but nevertheless does not have enough redundant bandwidth to reroute traffic around failures. Such a network can benefit from the additional bandwidth made available through the server 12. For example, if a failure occurs in an educational network, such as the Abilene network where, when two links are down, a single link can become a bottleneck and the total traffic demand on that link could be almost three (3) times its capacity even under optimal rerouting. However, using the present invention, the network can handle the failure scenarios without over-loading any links.

Similar to traditional Internet interdomain business relationships, the REIN server 12 can support multiple business models for the sharing of interdomain bypass paths. For example, in one preferred embodiment, the REIN server 12 supports a peering model where networks A and B provide mutual backup without financial settlement. This implementation can improve the reliability of both networks at low cost, and thus provide both networks with incentives. Similar to the traditional Internet peering relationship which depends on symmetry in traffic, the REIN server 12 can provide enforcement of symmetry in bypass path capacity provisioning and usage. A potential advantage of using the REIN server 12 for mutual backup through peering is that the two networks involved tend to have similar geographic coverage and thus the bypass paths are less likely to have long detour delay.

In another preferred embodiment, the REIN server 12 supports a cost-free model without the requirement for symmetry. For example, referring back to the educational network example, the educational network can be overlapped with many commercial IP networks. Although in typical cases the education network would not carry any commercial traffic, it is possible using the REIN server 12 of the present invention, that the education network provides interdomain bypass paths for commercial networks in emergencies, as these commercial networks are part of a critical national infrastructure.

In another preferred embodiment, the REIN server 12 supports a provider-customer model. This is similar to the traditional provider-customer relationship in the Internet; that is, network A pays network B to provide bypass paths. The cost model can be either a fixed pricing model or a usage-based pricing model. The usage of the bypass paths (e.g., in terms of amount of time and/or traffic volume) can be limited to avoid potential abuse. In the preferred embodiment, a bypass path provider can charge lower prices just as some ISPs charge lower prices for backup BGP links (e.g., shadow links of UUNet).

Figure 2:
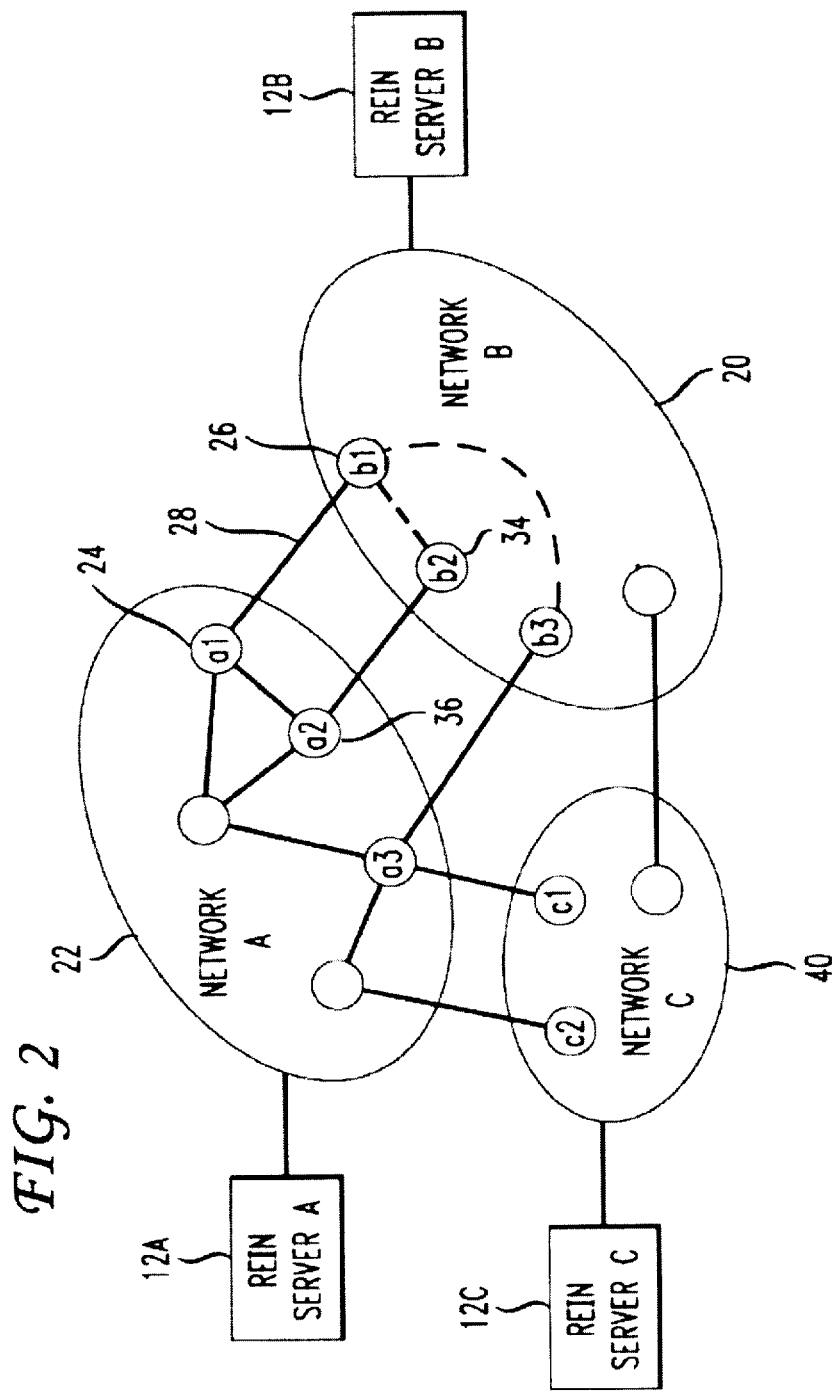
FIG. 2 is a block diagram illustrating REIN interdomain bypass paths signaling according to the present invention.

Turning now to FIG. 2, the REIN server 12 of the present invention can signal the existence of Interdomain Bypass Paths from network B 20 to network A 22. As shown in FIG. 2, network A 22 peers with network B 20 at multiple locations referred to as points of presence (PoPs).

As shown in FIG. 2, there can be multiple choices of protocols or mechanisms for network A 22 and B 20 to signal interdomain bypass paths. In one preferred embodiment, each network includes a dedicated REIN server 12A-C, and the protocol disclosed can be run over a TCP connection between the REIN servers 12A-C.

In one preferred embodiment, for example, to discover interdomain bypass paths re-entering at border router a1 24 of network A 22 through neighboring network B 20, al 24 makes a special BGP announcement to its corresponding peer b1 26, over the existing eBGP session 28 between a1 24 and b1 26. The destination address of the BGP announcement is a1 24. Preferably, the BGP announcement is considered a request for bypass paths in network B 20 through b1 26 back to a1 24. The message can include additional attributes such as desired starting points of the bypass paths (e.g., starting from a2 36 to B 20 and then to a1 24) and desirable bandwidth. Preferably, the additional attributes are carried as opaque attributes in the BGP message. The message carries a unique BGP community tag REIN PATH REQUEST to enable special treatment within each network.

Preferably, the BGP announcement goes through standard BGP export/import policies and is imported into the routing information base of b1 26. Periodically, inside B 20, the REIN server 12 extracts from border routers such request announcements using the tag REIN PATH REQUEST, and computes the interdomain bypass paths that it can provide, subject to its local policy. Preferably one objective of the local policy is to mitigate the operational difficulties involved in the planning for carrying another network's traffic. For instance, network B's 20 local policy could specify that bypass paths are provided to network A 22 only through lightly-loaded links.

In one preferred embodiment, if network B 20 provides bypass paths from border router b2 34, the REIN server 12b configures b2 34 to announce a BGP update message carrying a unique BGP community tag REIN PATH AVAILABLE to its peer a2 36. An example message sent from b2 34 to a2 36 is shown in FIG. 3.

In one preferred embodiment, the bypass path attribute in the REIN PATH AVAILABLE message does not include the complete router path inside B 20, to protect B's 20 private information. Preferably, the exported values of bandwidth are relatively stable to avoid frequent re-computation. In addition, in one preferred embodiment, the bandwidths are allocated bandwidths instead of the total bandwidth of a bypass path. In addition, the bandwidth(s) can be constrained by the bandwidths of the peering links. However, since it may be cost-effective to over-provision the bandwidth of a peering link than that of a link connecting two faraway locations, this might be a lesser concern. A delay value can also be used by network A 22 when there is delay requirement. Furthermore, the path metrics may also include pricing information in a more flexible system.

Preferably, the REIN servers 12A-C coordinate shared risk link groups (SRLGs) between the neighboring networks to assign consistent SRLG IDs to links or use a global information database. Two links belong to the same SRLG if they are considered to be likely to fail together. An example is two links that share some common conduit at some segment.

In one preferred embodiment, periodically, inside network A 22, using the tag REIN PATH AVAILABLE, the REIN server 12A extracts interdomain bypass paths announced by neighboring networks 20, 40. The server 12A then computes how to use these paths to improve reliability. For those paths the REIN server 12A chooses to use, the server 12A sends a BGP update message with a unique BGP community tag REIN PATH COMMIT to inform neighboring networks 20, 40. The neighboring networks 20, 40 can then configure their data forwarding path to allow usage of the path (as described below). It will be appreciated by one skilled in the art that this protocol can be extended to allow interdomain by-pass paths to traverse several networks.

A main data-path capability provided by the system is to allow traffic to leave and re-enter a network. This can be problematic in the prior art due to the separation of intradomain and interdomain routing. Specifically, a problem can occur relating to potential forwarding loops inside a neighboring network. Forwarding loops cannot arise in the hierarchical Internet routing, because that would imply a loop in AS paths. However, direct usage of interdomain bypass paths may cause forwarding loops. For example, consider the preceding example when the interdomain bypass path a2 36->b2 34->b1 26->a1 24, is used. When a2 36 uses the bypass path, it encapsulates a packet using source address a2 36 and destination address a1 24, and sends the encapsulated packet to b2 34. However, a router inside B 20 close to b2 34 may look up the destination address a1 24 and send the packet back to b2 34, causing a forwarding loop. To address this issue, in one preferred embodiment, the REIN server 12A establishes an interdomain GMPLS to setup an interdomain label switched path (LSP) for the whole interdomain bypass path. In another preferred embodiment, b2 34 configures an intradomain LSP from b2 34 to b1 26, and notifies a2 36 about the LSP. Then a2 36 uses IP tunneling to forward packets to b2 34, where the tunnel header (e.g., shim header) indicates that the LSP from b2 34 to bh 26 should be used.

As discussed above, interdomain bypass paths can be utilized in multiple ways. Now, a fast rerouting algorithm to efficiently utilize these paths will be described. It will be appreciated by one skilled in the art that the below described techniques can be applied both with and without interdomain bypass paths. For ease of understanding, the phrase 'interdomain bypass paths' is also referred to as 'interdomain bypass links' or 'virtual links'. A coverage-based path generation technique also will now be described that can be used to implement other traffic engineering related algorithms.

Referring back to FIG. 1, in one preferred embodiment, the REIN server 12 implements protection which pre-computes rerouting paths to use upon failure detection. As mentioned previously, there are two basic protection mechanisms: link protection (i.e., fast rerouting), and path protection. In fast rerouting, a detour around a failed link is created. In path protection, the sources of all flows using the failed link are notified and detour to avoid the failed link.

In one preferred embodiment, the method executed by the REIN server 12 comprises two steps. In the first step, the REIN server 12 computes optimal routing using traffic engineering when there are no failures. In the second step, the REIN server 12 computes fast rerouting for high-priority failure scenarios (i.e., when the total number of failure scenarios is exponential) on top of traffic engineering. Fast reroute provides a mechanism for automatically rerouting traffic on an LSP if a node or link in an LSP fails, thus reducing the loss of packets traveling over the LSP. Fast rerouting is accomplished by precomputing and pre-establishing a number of detours along the LSP. Each detour is established by an upstream node with the intent of avoiding the link toward the immediate downstream node and the immediate downstream node itself. Each detour might traverse through one or more label-switched routers.

Preferably, when the server 12 computes fast rerouting, it distinguishes important traffic (e.g., voice and VPN) and selects intradomain links, if possible, to protect such traffic.

Traffic engineering uses statistical techniques, such as queuing theory to predict and engineer the behavior of telecommunications networks, such as telephone networks or the Internet. The field was created by the work of A. K. Erlang in whose honor the unit of telecommunications traffic intensity, the Erlang, is named. The derived unit of traffic volume also incorporates his name. His Erlang distributions are still in common use in telephone traffic engineering. The crucial observation in traffic engineering is that in large systems the law of large numbers can be used to make the aggregate properties of a system over a long period of time much more predictable than the behavior of individual parts of the system. The queueing theory originally developed for circuit-switched networks is applicable to packet-switched networks. The most notable difference between these sub-fields is that packet-switched data traffic is self-similar. This is a consequence of the calls being between computers, and not people.

Teletraffic theory was first developed by Agner Erlang for circuit-switched architectures such as the PSTN. As such, the basics of teletraffic theory is best introduced by examining teletraffic concepts as they relate to PSTNs. The measurement of traffic in PSTNs allows network operators to determine and maintain the Quality of Service (QoS) and in particular the Grade of service (GoS) that they offer their subscribers. The QoS of a network must be maintained or else operators will lose subscribers. The performance of a network depends on whether all origin-destination pairs are receiving a satisfactory service.

Networks are handled as loss systems where calls that cannot be handled are given equipment busy tone or queuing systems where calls that cannot be handled immediately are queued. Congestion is defined as the situation when exchanges or circuit groups are inundated with calls and are unable to serve all the subscribers. Special attention must be given to ensure that such high loss situations do not arise. To help determine the probability of congestion occurring, operators should use the Erlang Equations or the Engset calculation. Exchanges in the PSTN make use of Trunking concepts to help minimize the cost of the equipment to the operator. Modern switches generally have full availability and do not make use of Grading concepts. Overflow systems make use of alternative routing circuit groups or paths to transfer excess traffic and thereby reduce the possibility of congestion.

Queueing systems used in telephone networks have been studied as a science. For example, subscribers are queued until they can be served. If subscribers are made to wait too long, they may lose patience and default from the queue, resulting in no service being provided.

A very important component in PSTNs is the SS7 Network used to route signalling traffic. As a supporting network, it carries all the signaling messages necessary to set up, break down or provide extra services. The signaling enables the PSTN control the manner in which traffic is routed from one location to another.

Transmission and switching of calls is performed using the principle of Time-Division Multiplexing (TDM). TDM allows multiple calls to be transmitted along the same physical path, reducing the cost of infrastructure. A good example of the use of teletraffic theory in practice is in the design and management of a call center. Call centers use teletraffic theory to increase the efficiency of their services and overall profitability through calculating how many operators are really needed at each time of the day.

Teletraffic engineering in broadband networks is a well-understood discipline in the traditional voice network, where traffic patterns are established, growth rates can be predicted, and vast amounts of detailed historical data are available for analysis. However, in modern Broadband Networks, the teletraffic engineering methodologies used for voice networks are inappropriate.

In one preferred embodiment, the server 12 implements optimal traffic engineering and fast rerouting using IP/MPLS. However, computation of optimal traffic engineering and fast rerouting directly using path-based routing (i.e., routing specified by how traffic is split among LSPs can be intractable, since there can be exponential number of candidate LSPs between each origin-destination (OD) pair. The server 12 then uses a representation called flow-based routing, in which the routing is specified at each link by the fraction of traffic of each OD pair that is routed on this link.

Accordingly, the system uses a flow-based routing representation to make computation tractable and then a path generation method to convert the flow-based routing into a practical implementation, as described below.

Preferably, the REIN server 12 integrates Traffic Engineering (TE)/FRR with VPNs using flow-based routing. For example, in one preferred embodiment, the REIN server 12 first conducts traffic engineering to determine base routing without failures. The uncertainty to handle in this case is traffic volume variations. Preferably, the server 12 bases the TE formulation using either the traditional oblivious routing technique developed by Applegate and Cohen or the COPE technique developed by Wang et al. and extends their techniques to provide VPN support. In oblivious routing, a system of optional paths is chosen in advance for every source-destination pair, and every packet for that pair must travel along one of these optional paths. Thus, the path a packet takes only depends on its source-destination pair (and maybe a random choice to select one of the options.

For example, in one preferred embodiment, the server 12 represents in its memory a network by a graph $G=(V,E)$, where V is the set of routers and E is the set of intradomain links. A variable E' is assigned the set of interdomain bypass links. The capacity of link $l(i,j)$ from node i to node j is denoted by $cap(i,j)$.

The server 12 assigns a memory variable X denote the set of all possible traffic demand matrices. Each traffic demand matrix $d \in X$ represents the end-to-end traffic demand between any two nodes inside the network. For traffic with destination outside the network, the server 12 preferably uses the COPE technique, as is known in the art, to convert interdomain traffic demand to intradomain traffic demand.

Next, the server 12 assigns a function $o(f,d)$ to be the performance of flow-based routing f under traffic demand matrix $d \in X$, where the flow-based routing f is specified by a set of values $f=\{f_{ab}(i,j)|a,b \in V,(i,j) \in E\}$ and $f_{ab}(i,j)$ specifies the fraction of demand from a to b that is routed over the link $(i,j)$. Note that this formulation assumes all traffic demand will be routed by traffic engineering. In addition, the formulation is extended to cover the case that most OD pairs are routed using a default routing (e.g., OSPF/ISIS), and only selected, major OD pairs (e.g., heavy hitters) are involved in defining f. Furthermore, the server 12 can aggregate routers inside a PoP for scalability. For example, in one preferred embodiment, the server 12 defines the function $o(f,D)$ to be the aggregated performance of routing f on the set D, where $D \in X$ is the set of common-case traffic demands. Preferably, the aggregation is performed, for example, by taking the maximum, or a weighted average.

In one preferred embodiment, the server 12 assigns a function $o(f, \chi)$ to be the penalty (cost) of routing f under traffic demand ft. Then the objective of the basic robust TE problem, and thereby the server 12, is to search for a base routing f that optimizes $o(f, D)$, subject to a worst-case penalty bound r on $c(f, d)$ for all $d \in X$.

As VPNs are particularly important to ISPs, in some preferred embodiments, the server 12 adds additional constraints to the preceding robust TE problem formulation. For example, in one preferred embodiment, the server 12 uses the known Hose model to specify VPN demand. Virtual private networks (VPN) provide a cost-effective means of meeting the communication needs among several sites. The hose model for VPN configuration alleviates the scalability problem of the pipe model by reserving bandwidth for traffic aggregates instead of between every pair of endpoints. Existing studies on quality of service (QoS) guarantees in the hose model deal only with bandwidth requirements. For each source (or destination) $\alpha \in V$, the server 12 denotes $ECR(\alpha)$ (resp. $ICR(\alpha)$) the total egress (resp. ingress) committed rate, which is the guaranteed total demand to (resp. from) all other nodes inside the network for VPNs. Then the additional constraints guarantee bandwidth provisioning for VPNs. Specifically, these constraints can be used to ensure that the base routing f is able to route, without overloading any intradomain link $l \in E$, an arbitrary VPN traffic demand matrix $d^w$ that conforms to the ECR and ICR specification.

Preferably, the REIN server 12 also implements robust fast rerouting. For example, in one preferred embodiment, the server 12 computes routing using the preceding formulation for f*. The server 12 then proceeds to compute fast rerouting $f^{rh}$ on top of f*, to protect against each high-priority link failure scenario h, where $h \subset E$ represents the failure of a set of links belonging to one or more SRLGs. The fast rerouting computation can use not only intradomain links in E but also interdomain bypass links in E'. To be robust to traffic variations when a failure scenario happens, in one preferred embodiment, the server 12 computes fast rerouting that minimizes the oblivious ratio on all possible total traffic demands.

Due to the high priority and sensitivity of VPN traffic, the server 12 can compute separate fast reroutings, $f^{h,B}$ for best-effort traffic and $f^{h,V}$ for VPN traffic, with the requirement that all VPN traffic be completely rerouted using intradomain links only. In another preferred embodiment, the server 12 computes a common fast rerouting, $f^h$ for both best-effort and VPN traffic. The detailed formulation and method implemented by the server 12 are mathematically shown in FIG. 5.

In one preferred embodiment, the server 12 processes peering link failures. For example, the method executed by the server 12 can be extended to directly connected interdomain peering links and take advantage of the point to multipoint flexibility for interdomain traffic. This can occur in the normal routing case and in the fast rerouting case. For the fast rerouting case, when an intradomain link i to j fails, the detour is a flow from i to J. As a contrast, for an interdomain link from i to a neighboring network B, the server 12 can use multiple peering points at B; $b_1, b_2, \ldots, b_3$, where the bs are border gateway routers between A and B. Accordingly, the server 12 can compute multiple flows $(i \rightarrow b_1), (i \rightarrow b_2), \ldots, (i \rightarrow b_3)$, and be extended to allow multiple egress networks.

Once the REIN server 12 computes base routing and fast rerouting using linear programming techniques and generates flow-based routing representations, the server 12 then converts the flow-based routing to a path-based routing with bounded performance penalty.

For example, in one preferred embodiment, the REIN server 12 uses flow decomposition to convert any flow-based routing representations to a path-based routing using up to |E| paths per OD pair. In an IP network, however, |E| could be large. Accordingly, the REIN server 12 considers the tradeoff between the number of paths and the performance gain, and enables one to choose paths based on preferences between performance and scalability.

A formalized notion of selecting effective paths to approximate a flow-based routing will now be described below. A method executed by the REIN server 12 to carry out this approximation will also be described. The method described includes two configurable parameters that can have different effects on performance and scalability.

The concept of coverage of a set of paths will now be described. Consider a flow-based routing $f=\{f_{ab}(i,j)|a, b \in V, (i,j) \in E\}$. For each OD pair $a \rightarrow b$, a graph is constructed where each edge $(i,j)$ has a capacity of $f_{ab}(i,j)$. Without loss of generality, an assumption is made that all cycles in f have already been removed, and thus the graph is a directed acyclic graph (DAG).

Next, Let $P_{ab} = \{P_{ab}^k | k=1, \ldots, K\}$ be a given set of K paths from a to b. A path-based routing over $P_{ab}$ specifies the fraction of traffic to be carried by each path in $P_{ab}$. Specifically, a path-based routing over can be represented by a vector $\chi_{ab} = \{\chi_{ab}^k 0 | k=1, \ldots, K\}$, where $\chi_{ab}^k$ denotes the fraction of demand from a to b that is routed on path $P_{ab}^k$. The value of $\chi_{ab}$, denoted by $|\chi_{ab}|$, is defined as $$|x_{ab}| = \sum_{k=1}^{K} x_{ab}^k \qquad (1)$$

A path-based routing $\chi_{ab}$ is valid if its value is 1.

DEFINITION 1. A set $P_{ab}$ of paths from a to b is a Q-percentage coverage path set (or Q-percentage path set for short) for flow-based routing $f_{ab}$ if there exists a path-based routing $\chi_{ab}$ over $P_{ab}$ that satisfies the following two conditions:

$$|x_{ab}| = Q \qquad (2)$$

$$\sum_{k, (i,j) \in P_{ab}^k} x_{ab}^k \leq f_{ab}(i,j), \forall (i,j) \in E \qquad (3)$$

Moreover, a set $P = \cup_{a,b \in V} P_{ab}$ is called a Q-percentage coverage path set for flow-based routing f if, for each OD pair $a \rightarrow b$, $P_{ab}$ is a Q-percentage path set of $f_{ab}$.

With the coverage of a set of paths, the server 12 can determine how well a set of paths approximate a given flow-based routing. This process can be stated formally as the following lemma:

LEMMA 1. Given a flow-based routing f and a Q-percentage path set P for f, a valid path-based routing $\chi = \{\chi_{ab} | a, b \in V\}$ over P can be constructed such that for any demand d, the routed traffic on any link $l \in E$ under $\chi$ is upper bounded by 1/Q of the routed traffic on l under f.

A detailed proof of the above Lemma 1 is shown in FIG. 6.

In general, consider any network performance metric a which is a function of |E|+1 variables: the utilization $u_l$ of link $l \in E$ and a function z(d) of a traffic demand matrix d; that is, $m = m(u_l, u_2, \ldots, u_{|E|}; z(d))$. Here, z(d) can be any function, as long as it depends only on d. One example z(d) is the optimal link utilization of the network under d. If m is monotonic increasing with respect to $u_l (l \in E)$, we have PROPOSITION 1. Given a flow-based routing f and a Q-percentage path set P for f, a valid path-based routing $\chi$ over P can be constructed such that for any demand d, the performance metric m under $\chi$ is upper bounded by $m(1, Q \cdot u_l, \ldots, 1/Q \cdot u_{|E|}; z(d))$, where $u_l$ is the utilization of link l under f.

For example, assume that $m(u_1, u_2, \ldots, u_{|E|}; z(d)) \triangleq \max_{l \in E} u_l$, which is a popular TE performance metric referred to as the bottleneck traffic intensity or maximum link utilization (MLU). Then the constructed valid path-based routing $\chi$ guarantees that, for any demand d, its bottleneck traffic intensity is at most 1/Q times that of the original flow-based routing f.

Having described the notion of the coverage of a path set, a method executed by the REIN server 12 is described. The method can be used for finding a small number of paths P guided by a flow-based routing f. The method to generate paths $P_{ab}$ from (a to b based on $f_{ab}$ is presented in FIG. 4. To generate the complete path set P, the same algorithm is repeated for each OD pair.

Generally, there can be two approaches to the termination condition. The first is to generate no more than a fixed number, K, of paths per OD pair, hereinafter referred to as IC-path coverage. A network may adopt this approach if it knows the maximum number of paths it wants to select for any OD pair. The network can then evaluate the performance of the selected path set by computing its coverage. The second approach terminates only after a certain coverage is achieved for every OD pair, and can thus bound the performance. This approach is hereinafter referred to as Q-percentage coverage.

As shown in step 4 of the method, the method computes the maximal unsplittable flow between a and b that satisfies the service level agreement (SLA) delay constraint. Preferably, the REIN server 12 does this in polynomial time based on the observation that a link with the lowest capacity on the maximal unsplittable flow path should be saturated. Specifically, the server 12 partitions links according to their capacities. For a certain capacity value C, the server 12 constructs a subgraph by removing all links with capacity less than C7. The server 12 then computes the lowest delay path from source a to destination b in this subgraph. If the delay of the computed path satisfies the SLA delay requirement, the server 12 has identified that there is an unsplittable flow satisfying the SLA constraint with flow rate at least C. Then, the server 12 conducts a binary search over all capacity values to identify the maximum unsplittable flow rate. Given this algorithm, at step 8, the server 12 removes at least one link in the network. Thus, in the worst case, the path set calculated consists of |E| paths.

The preceding description of processing assumes interdomain bypass paths to be used are already chosen. The system can also address the issue that an IP network may receive many interdomain bypass paths and selectively use a subset of these paths. Advantageously, this can reduce configuration overhead and/or cost for bypass paths with non-zero cost.

In one preferred embodiment, the server 12 selects interdomain bypass paths in two steps. In the first step, the server 12 selects interdomain bypass paths to improve the physical connectivity of the network. In the second step, the server 12 augments this selection with additional interdomain bypass paths to improve the performance of optimal fast rerouting for high priority failure scenarios.

Preferably, the server 12 selects interdomain bypass paths such that the link connectivities of all intradomain links are above a certain level (e.g., greater than 2 or 3). Formally, server 12 defines the link connectivity of a link as follows. DEFINITION 2 (LINK CONNECTIVITY). The link connectivity of a link is the minimal number of links (including the link itself) that must be removed in order to disconnect the two endpoints of this link.

For any link l∈E the server 12 denotes the function EC(l) to be the link connectivity of l. Accordingly, the function EC is hereinafter referred to as the link connectivity function.

Since each interdomain bypass path has associated (allocated) bandwidth(s) and aggregated delay, the server 12 first prunes those bypass paths with low bandwidths and long delays. Preferably, the thresholds used in this pruning process depend on the SLA requirements of the IP network. Among the interdomain bypass paths that survive the pruning, the server 12 selects a subset that minimizes the total cost while achieving the target connectivities.

This selection problem is defined by the server 12 as follows. Given
- a multigraph G=(V,E) that represents the network, similar to that defined in previously, except that G can contain parallel links due to the existence of multiple physical links between some pair of nodes;
- a set BYPASS of interdomain bypass links, each of which represents a different available interdomain bypass path. For a link l∈BYPASS, cost(l) can denote the cost of using the corresponding interdomain bypass path. There may be parallel links in BYPASS as there may be multiple interdomain bypass paths between the same pair of intradomain nodes from multiple neighboring networks.
- a link connectivity requirement function req for a selected (low connectivity) link set L⊂E;

the server 12 selects a subset E'⊂$\overline{BYPASS}$ such that, in the augmented graph G'=(V,E∪$\overline{E'}$), the link connectivity $EC_{G'}$(l)≦req(l), ∀l∈L, and the total cost, as defined by cost(E')= $\Sigma_{l\in E'}$cost(l) is minimized.

In one preferred embodiment, the server 12 formulates the selection problem as a Mixed Integer Program (MIP). Specifically, the server 12 assigns a memory location $\overline{G}$=(V, E∪BYPASS) to be a flow network with unit capacity on all links. Next, the server 12 assigns variables χ(l)∈{0,1}, l∈BYPASS to be the indicator variables of interdomain bypass link selection, such that χ(l)=1 if bypass link l is selected, and 0 otherwise. The MIP is preferably formulated as follows:

$$\min \sum_{l \subset BYPASS} \text{cost}(l) \cdot x(l) \quad (4)$$

subject to (s, t)=l∈L, $f_{(s,t)}$ is a s-t flow such that:

$$0 \le f_{(s,t)}(l) \le 1, l \in E \quad (5)$$

$$0 \le f_{(s,t)} \le x(l), l \in BYPASS \quad (6)$$

$$\sum_{k \in V} f_{(n,t)}(s, k) \ge req(s, t) \quad (7)$$

It will be appreciated by one skilled in the art that in the above MIP, the server 12 implements the Maximum-Flow Min-Cut Theorem to implicitly encode the link connectivity requirement. The max-flow min-cut theorem is a statement in optimization theory about maximum flows in flow networks. It derives from Menger's theorem. It states that the maximum amount of flow is equal to the capacity of a minimal cut. In other words, the theorem states that the maximum flow in a network is dictated by its bottleneck. Between any two nodes, the quantity of material flowing from one to the other cannot be greater than the weakest set of links somewhere between the two nodes. The server 12 then solves the MIP using ILOG CPLEX®, which is a mathematical programming optimizer.

In one preferred embodiment, the server 12 further augments the set of interdomain bypass paths to ensure desired performance level during fast rerouting. Note that the server 12 performs bypass selection in both of the two steps of the disclosed optimal fast rerouting algorithm. First, bypass selection determines part of the input set of links for optimal fast rerouting. Second, the coverage-based path generation phase of the fast rerouting algorithm selects paths that provide good coverage. Some of such paths may need to traverse interdomain bypass paths.

Preferably, the first sorts all available interdomain bypass paths from best to worst according to a scoring function. The scoring function employed can be cost, unit cost per bandwidth, or some combination of cost and bandwidth constraints. For each k, the server 12 selects the first k paths and tests the performance of fast rerouting based on this set of bypass paths. The selection process stops once the performance target is achieved.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A controller to provide network reliability, the controller comprising:
    a processing device; and
    a memory device storing instructions that, when executed by the processing device, cause the processing device to:
        extract a plurality of inter-domain bypass paths between a first inter-domain router associated with a first intra-domain portion and a second inter-domain router associated with a second intra-domain portion in a first network via a second network;
        determine an inter-domain bypass path from the extracted inter-domain bypass paths to link the first inter-domain router associated with the first intra-domain portion and the second inter-domain router associated with the second intra-domain portion in the first network via the second network in response to an intra-domain connectivity failure between the first intra-domain portion and second intra-domain portion; and
        establish an intra-domain label switched path in the second network and a tunnel from the first intra-domain portion in the first network to the intra-domain label switched path in the second network, the intra-domain label switched path and the tunnel being associated with the inter-domain bypass path to eliminate forwarding loops associated with the second network.

2. The controller of claim 1, wherein the memory device further comprises instructions that, when executed by the processing device, cause the processing device to route data packets between the first intra-domain portion and second intra-domain portion in the first network via the inter-domain bypass path using the tunnel to route packets from the first network to the second network and the intra-domain label switched path to route the packets in the second network.

3. The controller of claim 1, wherein the inter-domain bypass path links the first intra-domain portion and second intra-domain portion in the first network via two second networks.

4. The controller of claim 1, wherein the memory device further comprises instructions that, when executed by the processing device, cause the processing device to signal the availability of the inter-domain bypass path using border gateway protocol message.

5. The controller of claim 1, wherein the memory device further comprises instructions that, when executed by the processing device, cause the processing device to calculate the inter-domain bypass path from the plurality of inter-domain bypass paths to route data packets using traffic engineering.

6. The controller of claim 5, wherein the memory device further comprises instructions that, when executed by the processing device, cause the processing device to:
    compute fast rerouting in response to an intra-domain connectivity failure between the first intra-domain portion and second intra-domain portion in the first network; and
    select the inter-domain bypass path calculated from the plurality of inter-domain bypass paths based on the computation.

7. The controller of claim 6, wherein the memory device further comprises instructions that, when executed by the processing device, cause the processing device to:
    distinguish voice and virtual private network data packets from a plurality of data packets; and
    route the voice and virtual private network data packets over the inter-domain bypass path selected based on the computation.

8. The controller of claim 5, wherein the memory device further comprises instructions that, when executed by the processing device, cause the processing device to calculate the inter-domain bypass path by converting a flow representation of the data packets transmitted between origin and destination routers to a path-based routing representation.

9. The controller of claim 8, wherein the memory device further comprises instructions that, when executed by the processing device, cause the processing device to calculate the inter-domain bypass path by determining a maximum unsplittable flow between the origin and destination routers that satisfies a service level delay constraint.

10. The controller of claim 1, wherein the memory device further comprises instructions that, when executed by the processing device, cause the processing device to select the inter-domain bypass path from the plurality inter-domain bypass paths using a mixed integer program.

11. A method of providing network reliability, the method comprising:
    extracting, using a processing device, a plurality of inter-domain bypass paths between a first inter-domain router associated with a first intra-domain portion and a second inter-domain router associated with second intra-domain portion in a first network via a second network;
    determining, using the processing device, an inter-domain bypass path from the extracted inter-domain bypass paths to link the first inter-domain router associated with the first intra-domain portion and the second inter-domain router associated with the second intra-domain portion in the first network via the second network in response to an intra-domain connectivity failure between the first intra-domain portion and second intra-domain portion; and
    establishing, using the processing device, an intra-domain label switched path in the second network and a tunnel from the first intra-domain portion in the first network to the intra-domain label switched path in the second network, the intra-domain label switched path and the tunnel being associated with the inter-domain bypass path to eliminate forwarding loops associated with the second network.

12. The method of claim 11, further comprising routing data packets between the first intra-domain portion and second intra-domain portion of the first network via the inter-domain bypass path using the tunnel to route packets from the first network to the second network and the intra-domain label switched path to route the packets in the second network.

13. The method of claim 11, wherein the determined inter-domain bypass path links the first intra-domain portion and second intra-domain portion in the first network via two second networks.

14. The method of claim 11, further comprising signaling the availability of the inter-domain bypass path using a border gateway protocol message.

15. The method of claim 11, further comprising calculating the inter-domain bypass from the plurality of the inter-domain bypass paths to route data packets using traffic engineering.

16. The method of claim 15, further comprising:
computing fast rerouting in response to intra-domain connectivity failure between the first intra-domain portion and second intra-domain portion in the first network; and
selecting the inter-domain bypass path calculated from the plurality of inter-domain bypass paths based on the computation.

17. The method of claim 16, further comprising:
distinguishing voice and virtual private network data packets from a plurality of data packets; and
routing the voice and virtual private network data packets over the inter-domain bypass path selected based on the computation.

18. The method of claim 15, further comprising calculating the inter-domain bypass path by converting a flow representation of the data packets transmitted between origin and destination routers to a path-based routing representation.

19. The method of claim 18, further comprising calculating the inter-domain bypass path by determining a maximum unsplittable flow between the origin and destination routers that satisfies a service level delay constraint.

20. The method of claim 11, further comprising selecting the inter-domain bypass path from the plurality of inter-domain bypass paths using a mixed integer program.

\* \* \* \* \*